United States Patent Office 2,753,997
Patented July 10, 1956

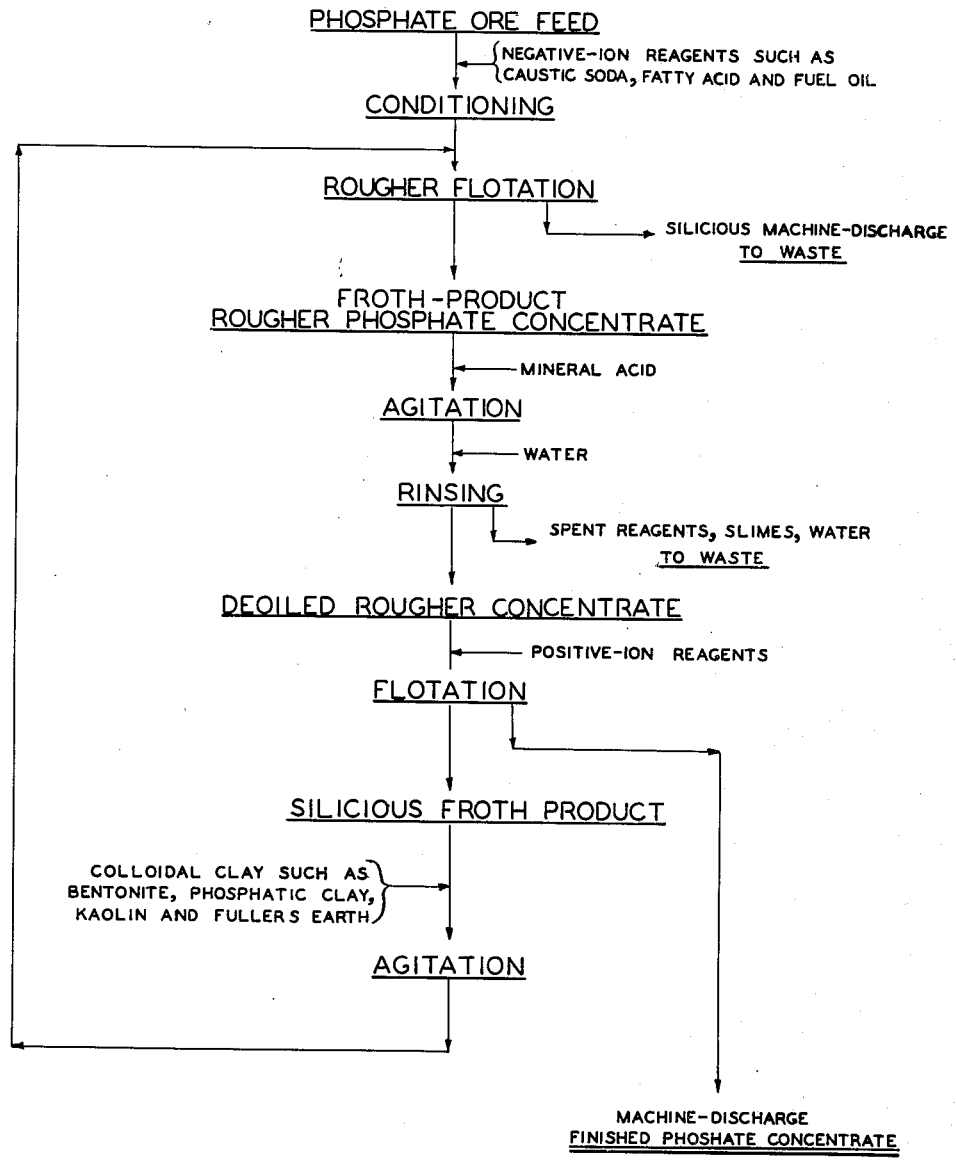

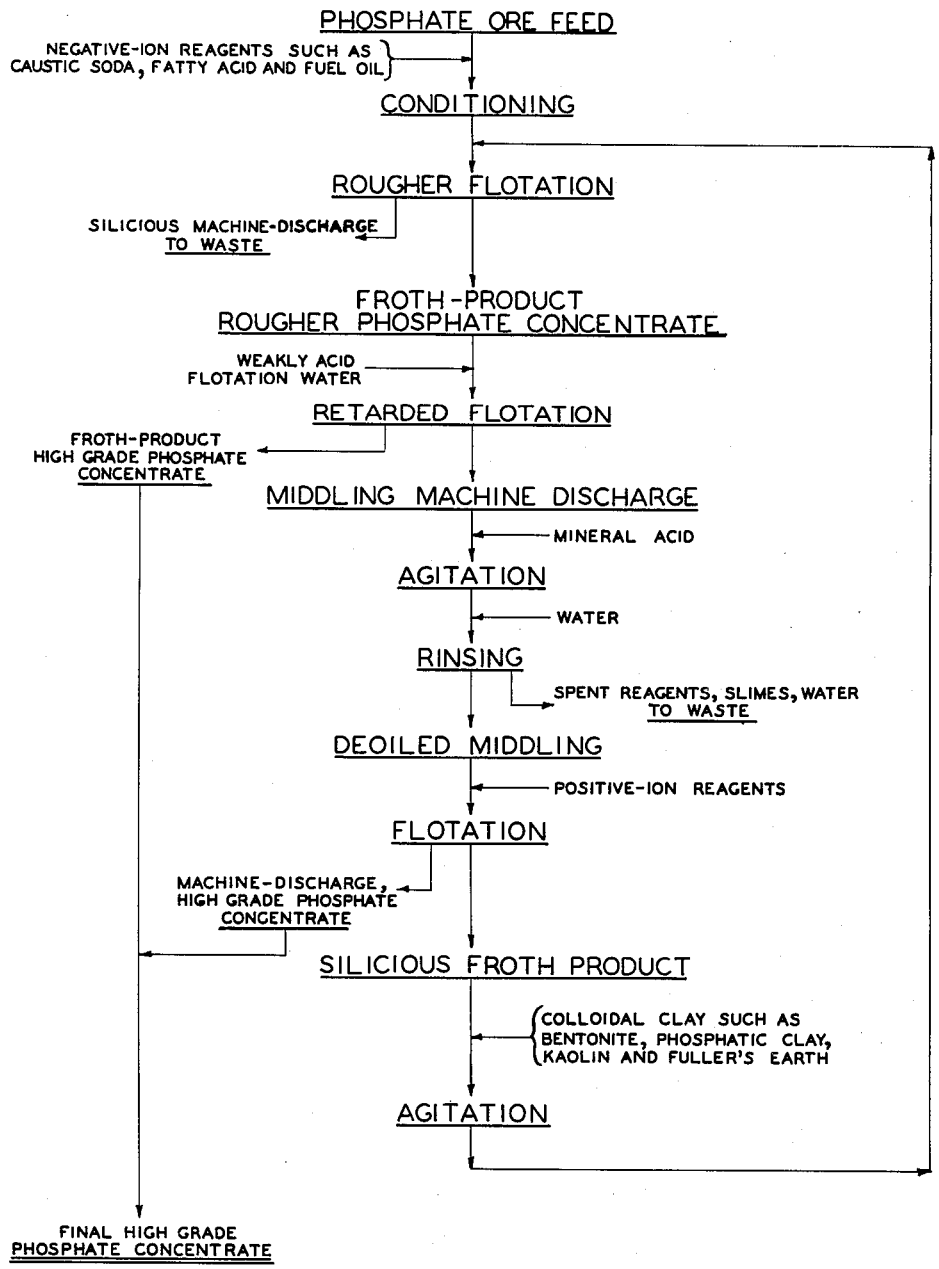

2,753,997

CONCENTRATION OF PHOSPHATE MINERALS

James B. Duke, Carlsbad, N. Mex., and Harvie W. Breathitt, Jr., Lakeland, Fla., assignors to Minerals & Chemicals Corporation of America, a corporation of Maryland Application December 12, 1952, Serial No. 325,666

20 Claims. (Cl. 209—166)

The present invention relates to the concentration of phosphate minerals from their ores, and may be regarded as an improvement upon the method covered by the patent to Arthur Crago 2,293,640, issued August 18, 1942, owned by the assignee of the present application. The present invention may also be regarded as an improvement on the method covered by the copending application of James B. Duke and Wesley M. Houston, Ser. No. 177,374, and now Patent No. 2,661,842, also owned by the assignee of the present application, which method is an improvement on the method of said Crago patent.

That Crago patent describes a method of concentrating phosphate minerals from their ores, which comprises (in the first step) subjecting the ore in an aqueous pulp to a concentrating operation with negative-ion reagents to separate a rougher concentrate of the phosphate values admixed with entrained silicous gangue; treating the said rougher phosphate concentrate (in the second step) with a mineral acid to remove the effect, on both the phosphate and silica particles, of the negative-ion reagents used in the production of said rougher concentrate; and then (in the third step) subjecting the thus acid-treated rougher concentrate in an aqueous pulp to a concentrating operation with a positive-ion reagent which is a selective collector for the gangue in said rougher phosphate concentrate to separate from it a collected material largely composed of the silicious gangue, thereby producing a final phosphate concentrate.

While the Crago method is a great improvement over ordinary methods of concentrating phosphate minerals (by flotation treatment using only negative-ion reagents, followed by a conventional cleaning operation) it has been found that the recovery of phosphate by the Crago method is often not as high as it should be. For example, the Crago patent reports recoveries of 79.2% and 87.5% in Examples 4 and 5. Such recoveries are largely due to the loss of phosphate in the silicious froth product, since in practice it is impossible to produce a pure silica float; it always contains more or less phosphate.

In the concentration of phosphate minerals by flotation employing only negative-ion reagents as above mentioned, the middling product from the cleaning operation is often returned and passes through the system again together with a new feed. In practicing the Crago method, however, the silicious froth-product cannot be treated as a middling in that way. In attempts to follow such a procedure in practicing the Crago method, a considerable amount of silica floats with the rougher concentrate, thus lowering the grade of the finished phosphate concentrate, while at the same time some of the phosphate does not float, thus causing a loss of phosphate in the tailings and an accumulation of phosphate in the middling which is returned to the original feed. Therefore, in practicing the Crago method the silicious froth-product containing a large part of the silica removed from the rougher flotation product and also a considerable amount of phosphate, has in practice been discarded.

The object of the present invention is to substantially improve the over all recovery of phosphate by the Crago and Duke and Houston methods, while at the same time maintaining the high grade of the final concentrate. This is accomplished by the present invention by treating the silicious froth-product resulting from flotation with positive-ion reagents as a middling in a manner which permits the recovery of a large part of the phosphate in it.

The invention is the result of our discovery that in practicing those methods, if the silicious froth-product resulting from flotation with positive-ion reagents is agitated in an aqueous pulp with a colloidal clay such as bentonite, phosphatic clay, kaolin or fuller's earth, and if the silicious froth-product is then returned as a middling to the feed to the rougher flotation operation with negative-ion reagents, then the recovery of phosphate is greatly improved without any substantial lowering of the grade of the final phosphate concentrate. In practicing the method of this invention, it seems to be important that the step of agitating the silicious middling with a colloidal clay shall take place before returning the middling to the new feed, and that the middling be added to the new feed after the latter has been conditioned with the necessary negative-ion reagents. The agitation of the silicious froth-product with a colloidal clay seems to deactivate the ingredients of the froth-product so that when the froth-product is added as a middling to a phosphate feed (which has been conditioned with negative-ion reagents) the phosphate in that middling will tend to be collected in the froth-product resulting from flotation treatment of the conditioned feed, and the silica in the middling will tend to remain in the machine discharge (a waste product) of that treatment.

In the flowsheet drawing, Fig. 1 shows the method of the present invention as an improvement on the method of the Crago patent; and Fig. 2 shows the method of the present invention as an improvement upon the method of the Duke and Houston application.

The method of the invention, as successfully practiced, is illustrated in the following examples.

*Example 1*

This example illustrates the invention as an improvement upon the method of the Crago patent. The description should be read with the aid of Fig. 1 of the drawing.

Six charges of deslimed low-grade phosphate rock each of 1000 grams, were treated in the following manner, the quantities of reagents employed being expressed in lbs. of reagents per ton of feed.

One of these 1000 gram charges of phosphate rock was conditioned with negative-ion reagents, consisting of 0.5 lb. caustic soda, 3.0 lbs. of fuel oil and 0.4 lb. of tall oil in a thick pulp of about 70% solids. From the thus conditioned pulp a rougher phosphate froth-product was removed by agitation and aeration in a laboratory minerals separation airflow flotation machine. The rougher phosphate concentrate thus obtained was agitated for about three minutes in an aqueous pulp containing about 50% solids, with 4.0 lbs. of sulfuric acid, after which the solids were rinsed with water and subjected to froth-flotation treatment with positive-ion reagents consisting of 0.1 lb. of "Armac T" and 0.2 lb. of kerosene, thereby producing a silicious froth-product. The reagent "Armac T" which is sold by Armour and Company is understood to consist of a mixture of hexadecyl, octadecyl and octadecenyl amine acetate in the proportions of about 30%, 25% and 45%, respectively. The residue (unfloated product) resulting from this operation, consisting of 392 gms. of high grade phosphate concentrate, formed the first part of the final concentrate.

The silicious froth-product was agitated in an aqueous pulp with 2 lbs. of bentonite (per ton of original feed) for 3 minutes at about 50% solids, and was added to the second charge of 1000 grams of the original phosphate feed which had already been conditioned with the aforesaid negative-ion reagents and diluted, and this feed was treated in the flotation machine in exactly the same manner as the first charge; thereby producing a rougher froth-product which was treated in the same manner as the first charge and produced a residue forming the second part of the final concentrate; and a silicious froth-product which was treated as a middling in the same manner as in the case of the first charge.

This procedure was repeated until the six charges of phosphate feed had been treated. The weights and assays of the products were as follows:

| Cycle No. | Amine Machine Discharge | | | Amine Froth-Product Tailings | | | |
|---|---|---|---|---|---|---|---|
| | Wt. | Percent BPL | Percent Ins. | Approx. Wt. | Percent BPL | Wt. | Percent BPL |
| 1 | 392 | 75.6 | 2.1 | 136 | | 493 | 1.5 |
| 2 | 393 | 76.3 | 1.9 | 146 | | 539 | 3.1 |
| 3 | 397 | 76.6 | 2.0 | 132 | | 629 | 3.3 |
| 4 | 397 | 76.4 | 2.1 | 141 | | 600 | 2.9 |
| 5 | 394 | 76.0 | 2.0 | 130 | | 619 | 2.9 |
| 6 | 400 | 75.7 | 2.1 | 145 | 11.0 | 592 | 2.4 |

In this table, the figures in the columns headed "Wt." give the weight in grams; "BPL" means bone phosphate of lime; "Machine discharge" refers to the residue which is the unfloated product; and "Ins." refers to insolubles.

It will be evident that the addition of the amine froth-product, after treatment with bentonite, to the feed of the next charge did not materially lower the grade of the phosphate concentrate; there was no tendency of the amine froth-product to increase in weight from one step to the next; and very little increase occurred in the amount of phosphate lost in the tailings.

The cumulative results of the test, omitting the last middling product (145 gms.; 11.0% BPL) which in practice would of course be added to new feed to pass through the system again, were as follows: Original feed, 32.3% BPL; combined concentrates, 76.1% BPL; recovery of BPL, 95%.

*Example 2*

This example illustrates the invention as an improvement upon the method of the Duke and Houston application, and the description should be read with the aid of Fig. 2 of the drawing.

In this example, the initial rougher phosphate froth-product was subjected to a retarded flotation treatment in a weakly-acid circuit, thereby producing a froth-product which was a high grade phosphate concentrate that was a part of the final phosphate concentrate; and a middling machine discharge which was deoiled and subjected to froth-flotation treatment with a negative-ion reagent. The unfloated material from this operation constituted the second portion of the finished concentrate while the froth-product was treated with a phosphatic clay in the manner of Example 1, and was then returned to and mixed with the next charge of the original conditioned feed as in Example 1.

The quantities of reagents used in this example, expressed in lbs. per ton of original feed, were as follows:

| | Lbs. |
|---|---|
| Caustic soda | 0.50 |
| Fuel oil | 3.00 |
| Tall oil | 0.40 |
| $H_2SO_4$ used in re-flotation of rougher concentrate | 2.70 |
| $H_2SO_4$ for deoiling the middling | 1.50 |
| "Armac T" | 0.05 |
| Kerosene | 0.10 |
| Pine oil | 0.06 |
| Phosphatic clay | 5.00 |

Nine charges, each of 1000 grams of phosphate ore were used in this test. Each charge of 1000 grams of phosphate ore, previously deslimed, was agitated for 2 minutes at 70% solids, with caustic soda, fuel oil and tall oil in the amounts above mentioned, and the thus conditioned pulp was subjected to treatment in a laboratory minerals separation airflow flotation machine. The rougher concentrate thus obtained was dewatered and agitated for about 5 seconds with water containing sulphuric acid to give a pH value of about 3.5, then diluted with similarly acidified water and subjected to froth-flotation treatment, giving a finished phosphate concentrate which was part of the final concentrate, and a middling product. The middling product was deoiled with sulphuric acid (by agitation at 50% solids for 3 minutes) rinsed with water, diluted with water, and then subjected to flotation treatment after conditioning with "Armac T," kerosene and pine oil in the amounts above mentioned, and a silicious froth was removed, leaving as the residue a non-floated phosphate product which constituted the second portion of the finished concentrate. The silicious froth-product (or middling) thus obtained was agitated in an aqueous pulp at 50% solids with phosphatic clay for 3 minutes, and was then added to a second charge of 1000 grams of phosphate feed which had already been conditioned with the negative-ion reagents above mentioned and diluted with water, in exactly the same manner as the first charge. This procedure was repeated until the nine charges of phosphate feed had been treated.

The test resulted as follows, the unfloated middlings being added to the first concentrate to form the final concentrate.

| Cycle No. | First Concentrate | | | Second Concentrate (Unfloated Middlings) | | | Middlings (Froth-Product) | | Tailings | |
|---|---|---|---|---|---|---|---|---|---|---|
| | Wt. | Percent BPL | Percent Ins. | Wt. | Percent BPL | Percent Ins. | Wt. | Percent BPL | Wt. | Percent BPL |
| 1 | 263 | 76.1 | 2.8 | 123 | 76.1 | 2.2 | 116 | | 487 | 1.7 |
| 2 | 314 | 75.6 | 3.1 | 68 | 75.6 | 2.7 | 106 | | 608 | 3.4 |
| 3 | 301 | 75.6 | 3.0 | 83 | 75.8 | 3.0 | 122 | | 588 | 3.7 |
| 4 | 292 | 75.8 | 3.0 | 96 | 76.2 | 2.2 | 110 | | 609 | 4.3 |
| 5 | 291 | 75.4 | 3.1 | 86 | 75.4 | 2.7 | 113 | | 600 | 4.0 |
| 6 | 310 | 75.2 | 3.3 | 79 | 75.3 | 2.7 | 125 | | 583 | 3.9 |
| 7 | 323 | 74.9 | 3.4 | 68 | 75.0 | 2.8 | 124 | | 593 | 3.6 |
| 8 | 310 | 75.4 | 3.4 | 77 | 75.3 | 2.8 | 117 | | 605 | 3.2 |
| 9 | 317 | 75.1 | 3.5 | 62 | 75.4 | 2.9 | 126 | 14.7 | 588 | 3.5 |

The overall results were 3463 gms. of finished concentrate assaying 75.4% BPL and 3.1% insolubles; 5261 gms. of tailings assaying 3.5% BPL; and 126 gms. of middlings which in practice would be returned to the head of the circuit to pass through the system again. This operation resulted in a recovery of 93.4% of the phosphate in the material treated, omitting the 126 gms. of final middlings in the calculation.

*Example 3*

This test was carried out in exactly the same way as Example 2, with the same quantities of the same reagents except that 0.15 lb. of "Arquad 18" was substituted for 0.05 lb. of "Armac T"; and 2.00 lbs. of kaolin was substituted for the 5.0 lbs. of phosphatic clay. The reagent known as "Arquad 18" is sold by Armour and Company and is understood to consist of octadecyl trimethyl ammonium chloride. The results were as follows:

| Cycle No. | First Concentrate | | | Second Concentrate (Unfloated Middlings) | | | Middlings (Froth-Product) | | Tailings | |
|---|---|---|---|---|---|---|---|---|---|---|
| | Wt. | Percent BPL | Percent Ins. | Wt. | Percent BPL | Percent Ins. | Wt. | Percent BPL | Wt. | Percent BPL |
| 1 | 333 | 74.7 | 3.5 | 70 | 75.0 | 2.7 | 106 | | 471 | 1.2 |
| 2 | 342 | 74.5 | 3.8 | 65 | 74.9 | 2.8 | 122 | | 579 | 2.2 |
| 3 | 341 | 75.0 | 3.5 | 64 | 74.9 | 3.0 | 119 | | 589 | 2.4 |
| 4 | 347 | 75.1 | 3.5 | 62 | 74.6 | 3.4 | 122 | | 574 | 1.8 |
| 5 | 353 | 75.0 | 3.6 | 57 | 74.1 | 3.3 | 128 | | 571 | 2.2 |
| 6 | 347 | 75.3 | 3.2 | 59 | 74.4 | 3.6 | 124 | | 594 | 1.8 |
| 7 | 349 | 74.9 | 3.6 | 57 | 74.4 | 3.3 | 113 | | 586 | 1.9 |
| 8 | 353 | 74.9 | 3.6 | 52 | 74.9 | 3.2 | 111 | | 584 | 1.8 |
| 9 | 340 | 75.4 | 3.4 | 69 | 74.9 | 2.8 | 110 | 7.1 | 597 | 1.9 |

Again, it will be noted that the grade of concentrates remained very uniform; there was no tendency for the middling froth-product to increase during the series of operations; and the grade of tailings remained low. The overall results in this example of a nine cycle test were as follows: 3105 grams of concentrates assaying 75.0% BPL and 3.4% insolubles; 5145 grams of tailing assaying 1.9% BPL; and 110 grams of middlings which in practice would be returned to the circuit. This represents a recovery of 96.6% of the phosphate as a high grade concentrate, and a remarkably small loss of phosphate in the tailings.

*Example 4*

In this example, as in Examples 2 and 3, the froth-product rougher phosphate concentrate was subjected to retarded-flotation treatment in a weakly acid pulp, thereby producing a froth-product which was a high-grade phosphate concentrate and a middling machine discharge. This middling was deoiled and a silica froth was floated from it by the use of positive-ion reagents, leaving as the unfloated product a machine-discharge which was a high-grade phosphate concentrate which was combined with the froth-product resulting from the retarded-flotation treatment. The silicious froth-product thus obtained was agitated with fuller's earth and added to the conditioned feed to be treated in the next cycle.

In this Example 4, nine cycles were employed; and the reagents and procedure were exactly the same as in Example 2, except that fuller's earth in the amount of 2.0 lbs. per ton of feed was used in each cycle instead of phosphatic clay; and except that the amine reagent known as "Amine 220" was used in the amounts of 0.15 lb. in the first cycle and 0.10 lb. both per ton of feed in the remaining eight cycles. "Amine 220" is a commercial product which is understood to consist principally of hydroxyl-ethyl-heptadecenyl glyoxalidine with small amounts of oleic acid amide and amino-ethyl ethanolamine.

The final results in this Example 4 were as follows: The feed contained 32.2% BPL. The combined concentrates contained 75.5% BPL and 3.2% insolubles. The tailings contained 2.8% BPL. The recovery of BPL was 94.8%.

It will be noted that in Example 1 the invention is illustrated as an improvement upon the method of the Crago patent, employing bentonite as the deactivating agent for the silicious froth-product before it is treated as a middling and returned to the circuit. In Examples 2, 3 and 4, the invention is illustrated as applied to the method of the Duke and Houston application, the deactivating agent employed on the silicious froth-product from that operation being phosphatic clay in Example 2, kaolin in Example 3, and fuller's earth in Example 4. Thus the examples teach how the invention may be successfully practiced with the use of typical colloidal clays for deactivating the silicious froth-product produced by the use of positive-ion reagents, thereby making that froth-product usable as a middling in the methods of the Crago patent and the Duke and Houston application.

What we claim is:

1. In the concentration of phosphate minerals during which a silica froth-product containing some phosphate is produced by a froth-flotation treatment employing positive-ion agents, the steps which consist of deactivating said product by agitating it in an aqueous pulp with a colloidal clay, and then subjecting it to further froth-flotation treatment with negative-ion agents.

2. The steps according to claim 1 in which the deactivated froth-product is mixed with the feed after the feed has been conditioned with negative-ion agents.

3. The improved method according to claim 1 employing bentonite as the colloidal clay.

4. The improved method according to claim 1 employing kaolin as the colloidal clay.

5. The improved method according to claim 1 employing phosphatic clay as the colloidal clay.

6. The improved method according to claim 1 employing fuller's earth as the colloidal clay.

7. In a method of concentrating phosphate minerals from their ores, which includes subjecting a phosphate concentrate in an aqueous pulp to froth-flotation treatment after conditioning with positive-ion agents, thereby producing a silica froth-product containing some phosphate; the improvement which consists in agitating said silica froth-product in an aqueous pulp with a colloidal clay, and then using the thus treated silica froth-product as a middling.

8. In the concentration of low-grade phosphate minerals in which a silica froth-product is removed by froth-flotation in a pulp containing positive-ion agents, the steps of deactivating said froth product by agitating it with a small amount of colloidal clay, and then subjecting it to further froth-flotation treatment with negative-ion agents.

9. In a method of concentrating phosphate minerals from their ores, which comprises producing from a feed of the ore by a concentrating operation employing negative-ion agents a rougher concentrate of the phosphate values admixed with silica gangue, treating said rougher concentrate with a mineral acid to remove the effects of the negative-ion agents, and subjecting said treated rougher concentrate in an aqueous pulp to a concentrating operation after conditioning with positive-ion reagents which are collectors for the silica gangue, thereby removing from the rougher concentrate a collected material largely composed of silica gangue but containing some phosphate; the improvement which consists in agitating said collected material in an aqueous pulp with a colloidal clay, and mixing the thus treated collected material as a middling with the feed.

10. The improved method according to claim 9 in which the said middling is mixed with the feed after the feed has been conditioned with the negative-ion agents.

11. The improved method according to claim 9 employing bentonite as the colloidal clay.

12. The improved method according to claim 9 employing kaolin as the colloidal clay.

13. The improved method according to claim 9 employing phosphatic clay as the colloidal clay.

14. The improved method according to claim 9 employing fuller's earth as the colloidal clay.

15. In a method of concentrating phosphate minerals from their ores, which comprises subjecting a feed of the ore in an aqueous pulp to froth-flotation treatment after conditioning with negative-ion agents thereby producing a froth-product containing most of the phosphate values admixed with silica gangue, subjecting said froth-product to a retarded froth-flotation treatment in a weakly acid aqueous pulp thereby producing a final high-grade concentrate and a middling machine discharge, treating said middling with a mineral acid to remove the effects of the negative-ion agents, and subjecting the so-treated middling in an aqueous pulp to a froth-flotation treatment after conditioning with positive-ion agents which are collectors for the silica gangue thereby removing a froth-product largely composed of silica gangue but containing some phosphate; the improvement which consists in agitating said silica froth-product in an aqueous pulp with a colloidal clay, and mixing the thus treated silica froth-product as a middling with the feed.

16. The improved method according to claim 15 in which the said middling is mixed with the feed after the feed has been conditioned with the negative-ion agents.

17. The improved method according to claim 15 employing bentonite as the colloidal clay.

18. The improved method according to claim 15 employing kaolin as the colloidal clay.

19. The improved method according to claim 15 employing phosphatic clay as the colloidal clay.

20. The improved method according to claim 15 employing fuller's earth as the colloidal clay.

References Cited in the file of this patent

UNITED STATES PATENTS

| | | |
|---|---|---|
| 1,446,376 | Borcherdt | Feb. 20, 1923 |
| 1,585,755 | Borcherdt | May 25, 1926 |
| 2,222,728 | Tartaron | Nov. 26, 1940 |
| 2,293,640 | Crago | Aug. 18, 1942 |
| 2,466,995 | McMurray | Aug. 12, 1949 |
| 2,614,692 | Lawver | Oct. 21, 1952 |
| 2,661,842 | Duke et al. | Dec. 8, 1953 |
| 2,665,004 | Zukosky | Jan. 5, 1954 |